United States Patent
Wang

(10) Patent No.: US 10,037,206 B2
(45) Date of Patent: Jul. 31, 2018

(54) METHODS AND SYSTEMS FOR STATE SWITCHING

(75) Inventor: Xiaowen Wang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 179 days.

(21) Appl. No.: 13/823,355

(22) PCT Filed: Sep. 22, 2011

(86) PCT No.: PCT/CN2011/079982
§ 371 (c)(1),
(2), (4) Date: Mar. 14, 2013

(87) PCT Pub. No.: WO2012/041182
PCT Pub. Date: Apr. 5, 2012

(65) Prior Publication Data
US 2013/0179667 A1  Jul. 11, 2013

(30) Foreign Application Priority Data

Sep. 29, 2010 (CN) .......................... 2010 1 0500406

(51) Int. Cl.
*H04L 29/06* (2006.01)
*G06F 9/30* (2018.01)
*G06F 21/74* (2013.01)

(52) U.S. Cl.
CPC .......... *G06F 9/30043* (2013.01); *G06F 21/74* (2013.01); *H04L 63/1441* (2013.01);
(Continued)

(58) Field of Classification Search
CPC ................ G06F 9/30043; G06F 21/74; G06F 2221/2145; G06F 2221/2105; G06F 21/78;
(Continued)

(56) References Cited

U.S. PATENT DOCUMENTS 5,434,981 A * 7/1995 Lenihan ................. H04Q 11/04
370/360
6,154,820 A * 11/2000 Tallo ............................ 711/167
(Continued)

FOREIGN PATENT DOCUMENTS

| CN | 1445680 A | 10/2003 |
|---|---|---|
| CN | 10123162 A | 7/2008 |
| CN | 101632083 A | 1/2010 |

*Primary Examiner* — John B King
(74) *Attorney, Agent, or Firm* — Anova Law Group, PLLC

(57) ABSTRACT

Disclosed are methods and systems for state switching. The method is applied to a first hardware system. The first hardware system is connected with a second hardware system. The first hardware system has a first operation state and a second operation state. The second hardware system includes a memory unit. The memory unit has a first access state and a second access state. The memory unit is in the first access state currently. The method includes: the first hardware system sends an access state switching instruction to the second hardware system when the first hardware system enters the second operation state from the first operation state, wherein, the access state switching instruction is adapted to switch the memory unit of the second hardware system from the first access state to the second access state. The application of the present invention can ensure the security of key data, avoid the access of key data by malicious software, reduce the implementation costs and has a higher extensibility.

13 Claims, 2 Drawing Sheets

(52) U.S. Cl.
CPC ............... *G06F 2221/2105* (2013.01); *G06F 2221/2145* (2013.01)

(58) Field of Classification Search
CPC ....... G06F 21/60; H04L 63/1441; G11C 7/22; Y10S 707/99939
USPC ...................................... 726/22–26; 713/193
See application file for complete search history.

(56) References Cited

U.S. PATENT DOCUMENTS

| | | |
|---|---|---|
| 6,330,648 B1 | 12/2001 | Wambach et al. |
| 7,694,096 B2 * | 4/2010 | Haustein et al. ............ 711/163 |
| RE43,103 E * | 1/2012 | Rozman et al. ................ 726/23 |
| 2002/0174337 A1 * | 11/2002 | Aihara .................... G06F 21/78 713/172 |
| 2002/0184523 A1 * | 12/2002 | Barrenscheen ......... G06F 21/78 726/34 |
| 2003/0021163 A1 * | 1/2003 | Nakazawa et al. ...... 365/189.12 |
| 2003/0023822 A1 * | 1/2003 | Scott .................... G06F 12/1433 711/163 |
| 2003/0037237 A1 * | 2/2003 | Abgrall .................. G06F 21/53 713/166 |
| 2003/0204737 A1 * | 10/2003 | Lee et al. ....................... 713/193 |
| 2007/0094470 A1 * | 4/2007 | Haustein ............. G06F 12/1441 711/163 |
| 2007/0222610 A1 * | 9/2007 | Tagato ............ G06K 19/07336 340/572.7 |
| 2008/0250509 A1 * | 10/2008 | Ahvenainen ........ G06F 12/1441 726/34 |
| 2010/0174866 A1 * | 7/2010 | Fujimoto et al. ............. 711/115 |
| 2010/0281276 A1 * | 11/2010 | Chang .................. G06F 1/3203 713/300 |
| 2010/0306848 A1 * | 12/2010 | Gellerich ................ G06F 21/53 726/24 |

\* cited by examiner

METHODS AND SYSTEMS FOR STATE SWITCHING

FIELD OF INVENTION

Embodiments of the present invention relate to computer data processing fields, in particular to methods and systems for state switching.

BACKGROUND OF INVENTION

Presently, with wide application of computers, some password hash values, random, keys, and the like often need to be saved in a computer system. Conventionally, these values are saved in a complementary metal-oxide-semiconductor random access memory (CMOS RAM) in a computer, a flash memory of a basic input/output system (BIOS Flash ROM) or a hard driver. These storage medium have no access limitation in an operating system, and have lower security.

In order to improve the security of key data such as passwords or keys, there is an independent EEPROM having a security protection function in the art to realize the access of the data. For example, Thinker Centre® and Think Pad® embed a specific chip AssetID in the system in order to improve the security level of key data. This chip may set an access control on the interior data, and set a storage limitation on the data block in this chip using BIOS, before entering the operating system. Accordingly, arbitrarily reading key data in the operating system can be avoided.

In the above scheme, a specific EEPROM having a security protection function must be used, though the storage security of key data is ensured, implementation costs will be increased.

SUMMARY OF INVENTION

Embodiments of the present invention provide methods and systems for state switching which may ensure the data security and reduce implementation costs, and have a higher extensibility.

An embodiment of the present invention provides a method for state switching which is applied for a first hardware system, wherein the first hardware system is connected with a second hardware system, the first hardware system has a first operation state and a second operation state, the second hardware system comprises a memory unit, the memory unit has a first access state and a second access state, the memory unit is in the first access state currently, the method includes:

sending an access state switching instruction to the second hardware system, when the first hardware system entering the second operation state from the first operation state;

wherein the access state switching instruction is adapted to switch the memory unit of the second hardware system from the first access state to the second access state.

The first operation state of the first hardware system includes an initial stage, and the second operation state includes an applying stage; or the first operation state of the first hardware system includes the applying stage, and the second operation state includes the initial stage.

The first access state includes an un-protected state, and the second access state includes a protected state; or the first access state includes the protected state, and the second access state includes the un-protected state.

An embodiment of the present invention further provides a method for state switching which is applied for a second hardware system, wherein the second hardware system is connected with a first hardware system, the second hardware system includes a memory unit, the memory unit has a first access state and a second access state, the memory unit is in the first access state currently, the method includes:

receiving, by the second hardware system, an access state switching instruction from the first hardware system, and switching the memory unit of the second hardware system from the first operation state to the second operation state;

wherein the access state switching instruction received by the second hardware system is sent by the first hardware system when the first hardware system enters the second access state from the first access state.

The first access state includes an un-protected state, and the second access state includes a protected state; or the first access state includes the protected state, and the second access state includes the un-protected state.

The first operation state of the first hardware system includes an initial stage, and the second operation state includes an applying stage; or the first operation state of the first hardware system includes the applying stage, and the second operation state includes the initial stage.

The method further includes:

receiving, by the second hardware system, an access request for reading/writing the memory unit from the first hardware system;

identifying an access state of the memory unit;

performing an operation on the memory unit according to the received access request and returning an operation result, if the memory unit being in a readable and writable state;

rejecting to perform the access request and returning an error result, if the memory unit being in unreadable and unwritable state.

An embodiment of the present invention further provides a first hardware system connected to a second hardware system, wherein, the first hardware system has a first operation state and a second operation state, the second hardware system includes a memory unit, the memory unit has a first access state and a second access state, the memory unit is in the first access state currently, the first hardware system includes:

a state detecting unit adapted to generate a detection result when the first hardware system entering the second operation state from the first operation state;

an instruction sending unit connected with the state detecting unit, and adapted to send an access state switching instruction to the second hardware system according to the detection result, The access state switching instruction is adapted to switch the memory unit of the second hardware system from the first access state to the second access state.

The memory unit included in the second hardware system is a portion of a data storage area in the second hardware system.

An embodiment of the present invention further provides a second hardware system connected to a first hardware system, the second hardware system includes a memory unit, the memory unit has a first access state and a second access state, the second hardware system includes:

a state converting unit adapted to switch the memory unit of the second hardware system from the first access state to the second access state;

an instruction receiving unit adapted to receive an access state switching instruction from the first hardware system, and notify the state converting unit of the received state switching instruction;

wherein the access state switching instruction received by the second hardware system is sent by the first hardware system when the first hardware system entering the second operation state from the first operation state.

The second hardware system further includes:

an access request receiving unit adapted to receive an access request for reading/writing the memory unit from the first hardware system;

a state identifying unit adapted to identify the access state of the memory unit, and output an identification result, a feedback performing unit connected with the state identifying unit, and adapted to perform an operation on the memory unit according to the received access request and return an operation result when the identification result being a readable and writable state; and reject to perform the access request and return an error information when the identification result being unreadable and unwritable state.

The memory included in the second hardware system is a portion of a built-in or built out data storage area in the second hardware system.

BRIEF DESCRIPTION OF THE DRAWINGS

In the following, the drawings used in the embodiments will be simply described, in order to explain the embodiments of the present invention clearly. Obviously, the following drawings are only some embodiments of the present invention. For one skilled in the art, every other drawing will be obtained according to these drawings without inventive labor.

DETAILED DESCRIPTION OF THE PREFERRED EMBODIMENTS

The solutions of embodiments of the present invention will be clearly and completely described from the following detailed description taken conjunction with the drawings. Obviously, the described embodiments are only a portion of embodiments of the present invention, rather than all embodiments. Based on embodiments in the present invention, every other embodiment obtained by one skilled in the art without inventive labors belongs to the protection scope of the present invention.

Figure 1:
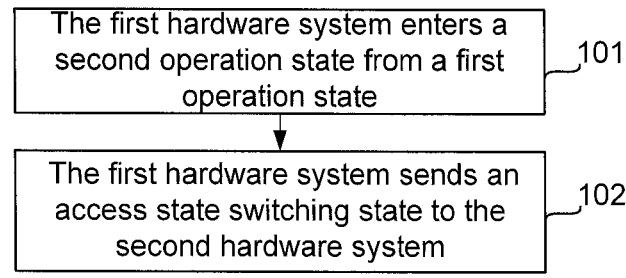
FIG. 1 illustratively shows a flowchart of a method for state switching according to an embodiment of the present invention.

Referring to FIG. 1, a flowchart of a method for state switching according to an embodiment of the present invention is shown. This embodiment is applied for a first hardware system, the first hardware system is connected with a second hardware system, the first hardware system has a first operation state and a second operation state, the second hardware system comprises a memory unit, the memory unit has a first access state and a second access state, the memory unit is at the first access state currently, the flowchart as shown in FIG. 1 particularly includes the following steps.

In step 101, the first hardware system enters the second operation state from the first operation state;

In step 102, the first hardware system sends an access state switching state to the second hardware system.

The access state switching instruction is adapted to switch the memory unit of the second hardware system from the first access state to the second access state.

It should be noted that, the first operation state of the first hardware system may be an initial stage, and the second operation state may be an applying stage. Or the first operation state of the first hardware system may be the applying stage, and the second operation state may be the initial stage.

For the initial stage, particularly, a system state such as hardware power on, hardware initialization, software system initialization inside a device, firmware user interaction is included.

For the applying stage, particularly, a series of state such as loading of the operating system, running of the operating system, running of a client application program are included.

It should be noted that, the first access state may be an un-protected state, and the second access state may be a protected state. Or, the first access state may be the protected state, and the second access state may be the un-protected state. Here, the protected state refers to an unreadable and unwritable state or a readable and unwritable state, or an unreadable and writable state. The un-protected state refers to readable and writable state.

For example, the first access state of the memory unit of the second hardware system may be the readable and writable state, and the second access state may be the unreadable and unwritable state or the readable and unwritable state, or the unreadable and writable state, when the first operation state of the first hardware system is the initial stage, and the second operation state is the applying stage.

As another example, the first access state of the memory unit of the second hardware system may be the unreadable and unwritable state or the readable and unwritable state, or the unreadable and writable state, and the second access state may be the readable and writable state, when the first operation state of the first hardware system is the applying stage, and the second operation state is the initial stage It should be noted that, the above access state switching instruction may a command, and also a signal.

It should be noted that, the above first hardware system may be connected with the second hardware system through a data passage. Particularly, the data channel may be any existing channel which can transmit data, for example, communication network (such as LAN), I2C channel, LPC (Low Pin Count), PCI (Peripheral Component Interconnect) bus, ISA (Industrial Standard Architecture), SPI (Serial Peripheral Interface) bus and the like.

It should be noted that, the above first hardware system and second hardware system are two different electronic device respectively. For example, the first hardware system may at least have a mainboard, a CPU, a data storage area, and an electronic device of an application program used to interact with a user. The second hardware system may be an embedded system which at least comprises a portion of a built-in or built-out data storage area. The memory unit in the second hardware system is the built-in or built-out data storage area in the embedded system. For example, the above storage unit may be a RAM (Random Access Memory) and/or a ROM (Read Only Memory).

Figure 2:
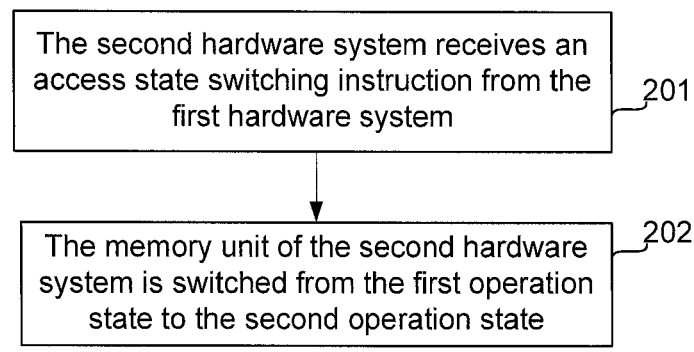
FIG. 2 illustratively shows a flowchart of a further method for state switching according to an embodiment of the present invention.

Referring to FIG. 2, a flowchart of a method for state switching according to an embodiment of the present invention is shown. This embodiment is applied for a second hardware system, the second hardware system is connected with a first hardware system, the second hardware system includes a memory unit, the memory unit has a first access state and a second access state, the memory unit is in the first access state currently, the flowchart as shown in FIG. 2 particularly includes the following steps.

In step 201, the second hardware system receives an access state switching instruction from the first hardware system.

In step 202, the memory unit of the second hardware system is switched from the first operation state to the second operation state.

The access state switching instruction received by the second hardware system is sent by the first hardware system when the first hardware system enters the second access state from the first access state.

It should be noted that, after step 202, the method may further includes: receiving, by the second hardware system, an access request for reading/writing the memory unit from the first hardware system; identifying the access state of the memory unit; performing an operation on the memory unit according to the received access request and returning an operation result, if the memory unit being in a readable and writable state; rejecting to perform the access request and returning an error information, if the memory unit being in unreadable and unwritable state. That is to say, the second hardware system may perform a respective operation according to the received access request, and returns a operation result, if the memory unit is a readable and writable state; the second hardware system does not perform the request operation, if the memory unit is in an unreadable and unwritable state, at this time, the returned error information may prompt that there is no access right, and the current state is the unreadable and unwirtable state.

It should be noted that, the first operation state of the first hardware system may be an initial stage, and the second operation state may be an applying stage. Or the first operation state of the first hardware system may be the applying stage, and the second operation state may be the initial stage. Various states included in the initial stage and the applying stage are the same as those mentioned above.

It should be noted that, the first access state may be an un-protected state, and the second access state may be a protected state. Or, the first access state may be the protected state, and the second access state may be the un-protected state. Here, the protected state refers to an unreadable and unwritable state or a readable and unwritable state, or an unreadable and writable state. The un-protected state refers to readable and writable state.

Particularly, the first access state of the memory unit of the second hardware system may be the readable and writable state, and the second access state may be the unreadable and unwritable state or the readable and unwritable state, or the unreadable and writable state, when the first operation state of the first hardware system is the initial stage, and the second operation state is the applying stage.

As another example, the first access state of the memory unit of the second hardware system may be the unreadable and unwritable state, or the readable and unwritable state, or the unreadable and writable state, and the second access state may be the readable and writable state, when the first operation state of the first hardware system is the applying stage, and the second operation state is the initial stage.

It should be noted that, the above access state switching instruction may a command, and also a signal.

It should be noted that, the above first hardware system may be connected with the second hardware system through a data passage. Particularly, the data passage may be any existing passage which can transmit data, for example, network, I2C passage and the like.

It should be noted that, the above first hardware system and second hardware system are two different electronic device respectively. For example, the first hardware system may at least have a mainboard, a CPU, a data storage area, and an electronic device of an application program used to interact with a user. The second hardware system may be an embedded system which at least comprises a portion of a built-in or built-out data storage area. The memory unit in the second hardware system is the built-in or built-out data storage area in the embedded system. For example, the above storage unit may be a RAM and/or a ROM.

Thus, the application of the method provided by the embodiments of the present invention can the security of key data can be ensured, avoid the access of key data by the malicious software, reduce implementation costs, and has a higher extensibility.

Figure 3:
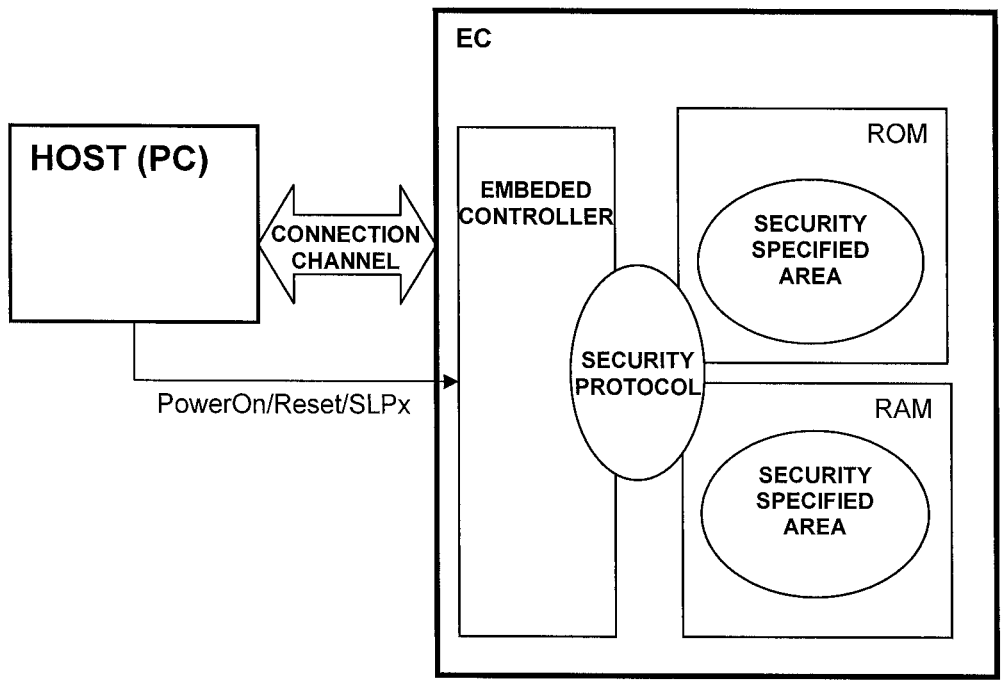
FIG. 3 shows a schematic diagram of state switching of a specific example.

Referring to FIG. 3, a schematic diagram of state switching of a specific example is shown. In this embodiment, the first hardware system is a host which is a PC, and the second hardware system is in an EC (Embedded Controller) inside the host. In this embodiment, a security controllable ROM and/or RAM data space is provided to a main system of PC in the EC sub-system, in order to ensure the security of key data, and avoid the access of key data by the malicious software. A particular implemented procedure is as follow.

A data region having a specified size (Secure ROM Data and Secure RAM Data) is separated out of the ROM and RAM of the EC. Obviously, the memory of these data belongs to the EC sub-system, the EC also controls whether these data can be accessed by PC main system. The main system must access theses data through the two channel passage "Link Bus". The EC may implement a related data exchange using an address mapping manner and a protocol which is appointed with the main system.

For example, all data blocks contained in the ROM and/or RAM data space in the EC are set as a "readable and writable" state, when the main system just powers on or after the main system is reset. The main system notifies EC to set the separated data area having the specified size as "an unreadable and unwritable" state, when the main system BIOS ends running and before loading the operating system (that is, the initial stage ends, and before the applying stage begins), and an access right is set as the "readable and writable" state only when resetting the main system next time. In this way, it is ensured that these data is not exposure when the main system running.

In this way, after the initial stage (i.e. BIOS running) ends, a strategy will be enabled, to make the programs in the following applying stages (such as, loading of the operating system->running of the operating system->running of the client application program) have no faith in information of the separated specified area. Thus, the software level cannot obtain the data of the specified area, and the security of key data will be improved.

The above access state switching instruction may be a command and also a signal, such as a power on signal, a reset signal, SLPx power supply state signal and the like.

That is to say, the EC may combine with a power supply signal and the other signal of the main system, for example, a power state signal and a BIOS signal from the main system, or the power state signal and application program signal from the main system, or the power state signal from the main system, the BIOS signal and the application program signal, and the right of the specified area separated according to different strategies. Of course, the right of the separated area may be the unreadable and writable state, the readable and unwriable state in addition to the readable and writable state, the unreadable and unwritable state.

Figure 4:
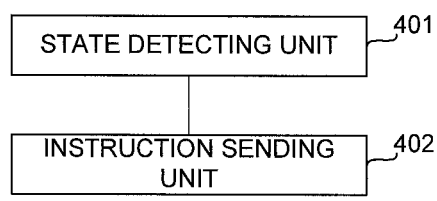
FIG. 4 is a structure schematic diagram of a state switching apparatus according to a third embodiment of the present invention.

An embodiment of the present invention further provides a first hardware system, referring to FIG. 4, the first hardware system is connected to a second hardware system, the first hardware system has a first operation state and a second operation state, the second hardware system comprises a memory unit, the memory unit has a first access state and a second access state, the memory unit is in the first access state currently, the first hardware system includes:

a state detecting unit 401 adapted to generate a detection result when the first hardware system entering the second operation state from the first operation state;

an instruction sending unit 402 connected with the state detecting unit, and adapted to send an access state switching instruction to the second hardware system according to the detection result, The access state switching instruction is adapted to switch the memory unit of the second hardware system from the first access state to the second access state.

The memory unit included in the above second hardware system is a portion of a data storage area in the second hardware system.

The above first hardware system and second hardware system are two different electronic device respectively. For example, the first hardware system may at least have a mainboard, a CPU, a data storage area, and an electronic device of an application program used to interact with a user. The second hardware system may be an embedded system which at least comprises a portion of a built-in or built-out data storage area. The memory unit in the second hardware system is the built-in or built-out data storage area in the embedded system. For example, the above storage unit may be a RAM and/or a ROM.

Figure 5:
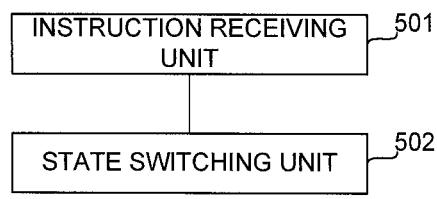
FIG. 5 is a structure schematic diagram of a state switching apparatus according to a third embodiment of the present invention.

An embodiment of the present invention further provides a second hardware system, referring to FIG. 5, the second hardware system is connected to a first hardware system, the second hardware system comprises a memory unit, the memory unit has a first access state and a second access state, the second hardware system includes:

a state converting unit 501 adapted to switch the memory unit of the second hardware system from the first access state to the second access state;

an instruction receiving unit 502 adapted to receive an access state switching instruction from the first hardware system, and notify the state converting unit of the received instruction;

The access state switching instruction received by the second hardware system is sent by the first hardware system when the first hardware system entering the second operation state from the first operation state.

The second hardware system further includes:

an access request receiving unit (not shown) adapted to receive an access request for reading/writing the memory unit from the first hardware system;

a state identifying unit (not shown) adapted to identify the access state of the memory unit, and output a identification result;

a feedback performing unit (not shown) connected with the state identifying unit, and adapted to perform an operation on the memory unit according to the received access request and return an operation result when the identification result being at a readable and writable state; and reject to perform the access request and return an error information when the identification result being at unreadable and unwritable state.

The memory included in the second hardware system is a portion of a built-in or built out data storage area in the second hardware system.

The above first hardware system and second hardware system are two different electronic device respectively. For example, the first hardware system may at least have a mainboard, a CPU, a data storage area, and an electronic device of an application program used to interact with a user. The second hardware system may be an embedded system which at least comprises a portion of a built-in or built-out data storage area. The memory unit in the second hardware system is the built-in or built-out data storage area in the embedded system. For example, the above storage unit may be a RAM and/or a ROM.

Thus, the application of the method provided by the embodiments of the present invention can the security of key data can be ensured, avoid the access of key data by the malicious software, reduce implementation costs, and has a higher extensibility.

For system embodiments, since they are similar with the method embodiments, and the description of them is simpler, related portions of them refer to the explanation of method embodiments.

Herein, terms such as "first" and "second" are only for distinguishing an entity or operation from another one, other than specifying or implying certain sequence of these entities or operations. Terms "comprise," "include" and any variants thereof are not exclusive. That a process, method, article or device includes some elements means that such process, method, article or device may include additional or intrinsic elements other than the explicitly listed elements. The phase "including an element" does not exclude that more than one such element is included.

Based on the description of exemplary embodiments, those skilled in the art will understand that the exemplary embodiments may be implemented in a general hardware platform programmed with software, or entirely in hardware. The former implementation is preferred in most cases. The exemplary embodiments may be implemented in the form of computer software product which can be stored in some storage medium, such as ROM/RAM, magnetic disk, optical disk.

While some embodiments of the present invention have been described, it should be noted that many changes and modifications can be made by those skilled in the art without departing from the principle of the present invention. These changes and modifications are encompassed by the scope of the present invention.

What is claimed is:

1. A method for state switching which is applied for an electronic device comprising at least a main board, a CPU, a BIOS, and a data storage area, and being configured to run an operating system and an application program used to interact with a user, wherein an embedded controller is inside the electronic device, logically separated from the BIOS, and connected to the electronic device, the electronic device has a first operation state and a second operation state, the embedded controller comprises a memory unit, the embedded controller controls whether data stored in the memory unit can be accessed by the operating system of the electronic device, and the memory unit has a first access state and a second access state, the memory unit is in the first access state currently, the method comprises:
sending, by the electronic device, an access state switching instruction to the embedded controller, when the electronic device entering the second operation state from the first operation state; and
switching, by the embedded controller, the memory unit from the first access state to the second access sate,
wherein the first operation state of the electronic device comprises an initial stage, and the second operation state comprises an applying stage; or the first operation state of the electronic device comprises the applying stage, and the second operation state comprises the initial stage,
wherein the memory unit is one data storage portion divided from among an entire data storage area in the embedded controller, and
the first access state comprises an un-protected state, and the second access state comprises a protected state; or
the first access state comprises the protected state, and the second access state comprises the un-protected state.

2. The method according to claim 1, wherein:
the initial stage comprises at least one of: hardware power on, hardware initialization, software system initialization, or firmware user interaction; and
the applying stage comprises at least one of: loading of the operating system, running of the operating system, or running of a client application program.

3. A method for state switching which is applied for an embedded controller, wherein the embedded controller is inside an electronic device and connected with the electronic device, the electronic device comprises at least a main board, a CPU, a BIOS, and a data storage area, and being configured to run an operating system and an application program used to interact with a user, the embedded controller is logically separated from the BIOS and comprises a memory unit, the embedded controller controls whether data stored in the memory unit can be accessed by the operating system of the electronic device, and the memory unit has a first access state and a second access state, the memory unit is in the first access state currently, the method comprises:
receiving by the embedded controller, an access state switching instruction from the electronic device, and
switching, by the embedded controller, the memory unit of the embedded controller from the first access state to the second access state;
wherein the access state switching instruction received by the embedded controller is sent by the electronic device when the electronic device enters a second operation state from a first operation state,
wherein the first operation state of the electronic device comprises an initial stage, and the second operation state comprises an applying stage; or the first operation state of the electronic device comprises the applying stage, and the second operation state comprises the initial stage,
wherein the memory unit is one data storage portion divided from among an entire data storage area in the embedded controller, and
the first access state comprises an un-protected state, and the second access state comprises a protected state; or
the first access state comprises the protected state, and the second access state comprises the un-protected state.

4. The method according to claim 3, further comprises:
receiving, by the embedded controller, an access request for reading or writing the memory unit from the electronic device;
identifying whether the embedded controller is currently in the first access state or the second access state,
performing an operation on the memory unit according to the received access request and returning an operation result, when the memory unit being in a readable or writable state; rejecting to perform the access request and returning an error result, when the memory unit being in an unreadable or unwritable state.

5. The method according to claim 3, wherein:
the initial stage comprises at least one of: hardware power on, hardware initialization, software system initialization, or firmware user interaction; and
the applying stage comprises at least one of: loading of the operating system, running of the operating system, or running of a client application program.

6. An electronic device comprising: at least a main board, a CPU, a BIOS, and a data storage area, and being configured to run an operating system and an application program used to interact with a user, wherein an embedded controller is inside the electronic device, logically separated from the BIOS, and connected to the electronic device, and the electronic device has a first operation state and a second operation state, the embedded controller comprises a memory unit, the embedded controller is configured to whether data stored in the memory unit can be accessed by the operating system of the electronic device, and the memory unit has a first access state and a second access state, the memory unit is in the first access state currently, the electronic device further comprises:
a state detecting unit adapted to generate a detection result when the electronic device entering the second operation state from the first operation state, wherein the first operation state of the electronic device comprises an initial stage, and the second operation state comprises an applying stage; or the first operation state of the electronic device comprises the applying stage, and the second operation state comprises the initial stage;
an instruction sending unit connected with the state detecting unit, and adapted to send an access state switching instruction to the embedded controller according to the detection result,
wherein the access state switching instruction is adapted to switch the memory unit of the embedded controller from the first access state to the second access state,
wherein the memory unit is one data storage portion divided from among an entire data storage area in the embedded controller, and
the first access state comprises an un-protected state, and the second access state comprises a protected state; or
the first access state comprises the protected state, and the second access state comprises the un-protected state.

7. The electronic device according to claim 6, wherein:
the initial stage comprises at least one of: hardware power on, hardware initialization, software system initialization, or firmware user interaction; and
the applying stage comprises at least one of: loading of the operating system, running of the operating system, or running of a client application program.

8. An embedded controller inside an electronic device and connected to the electronic device, the electronic device comprising at least a main board, a CPU, a BIOS, and a data storage area, and an application program used to interact with a user, wherein the embedded controller comprises:
a memory unit, wherein the memory unit has a first access state and a second access state, and the embedded controller is configured to control whether data stored in the memory unit can be accessed by the operating system of the electronic device based on an access state of the memory unit;

a state converting unit adapted to switch the memory unit of the embedded controller from the first access state to the second access state;

an instruction receiving unit adapted to receive an access state switching instruction from the electronic device, and notify the state converting unit of the received instruction;

wherein the access state switching instruction received by the embedded controller is sent by the electronic device when the electronic device entering a second operation state from a first operation state, wherein the first operation state of the electronic device comprises an initial stage, and the second operation state comprises an applying stage; or the first operation state of the electronic device comprises the applying stage, and the second operation state comprises the initial stage, wherein the memory unit is one data storage portion divided from among an entire data storage area in the embedded controller, and the first access state comprises an un-protected state, and the second access state comprises a protected state; or the first access state comprises the protected state, and the second access state comprises the un-protected state.

9. The embedded controller according to claim 8, wherein the embedded controller further comprises:

an access request receiving unit adapted to receive an access request for reading or writing the memory unit from the electronic device;

a state identifying unit adapted to identify whether the embedded controller is currently in the first access state or the second access state, and output an identification result, a feedback performing unit connected with the state identifying unit, and adapted to perform an operation on the memory unit according to the received access request and return an operation result when the identification result being a readable or writable state; and reject to perform the access request and return an error information when the identification result being in an unreadable or unwritable state.

10. The embedded controller according to claim 8, wherein:

the initial stage comprises at least one of: hardware power on, hardware initialization, software system initialization, or firmware user interaction; and the applying stage comprises at least one of: loading of the operating system, running of the operating system, or running of a client application program.

11. The embedded controller according to claim 8, wherein:

when the first operation state of the electronic device comprises the initial stage, and the second operation state comprises the applying stage, the state converting unit is adapted to switch the memory unit of the embedded controller from the un-protected state to the protected state based on the access state switching instruction.

12. The embedded controller according to claim 8, wherein:

when the first operation state of the electronic device comprises the applying stage, and the second operation state comprises the initial stage, the state converting unit is adapted to switch the memory unit of the embedded controller from the protected state to the un-protected state based on the access state switching instruction.

13. The embedded controller according to claim 8, wherein:

the access sate switching instruction is a power state signal, a reset signal, a BIOS signal, or an application program signal; and the embedded controller is configured to, based on a signal type of the access sate switching instruction, determine the access state of the memory unit corresponding to the signal type of the access sate switching instruction.

\* \* \* \* \*